United States Patent [19]

Torobin

[11] Patent Number: 4,536,361
[45] Date of Patent: Aug. 20, 1985

[54] METHOD FOR PRODUCING PLASTIC MICROFILAMENTS

[76] Inventor: Leonard B. Torobin, Materials Technology Corp., Tower Pl., Suite 1425, 3340 Peach Tree Rd., NE., Atlanta, Ga. 30326

[21] Appl. No.: 442,108

[22] Filed: Nov. 16, 1982

Related U.S. Application Data

[60] Continuation-in-part of Ser. No. 428,923, Sep. 30, 1982, , and Ser. No. 325,594, Nov. 27, 1981, Pat. No. 4,363,646, which is a continuation-in-part of Ser. No. 152,693, May 23, 1980, Pat. No. 4,303,431, which is a continuation of Ser. No. 59,297, Jul. 20, 1979, abandoned, said Ser. No. 428,923, is a continuation of Ser. No. 103,113, Dec. 13, 1979, abandoned, which is a division of Ser. No. 59,296, Jul. 20, 1979, abandoned, said Ser. No. 59,297, and Ser. No. 59,296, each is a continuation-in-part of Ser. No. 937,123, Aug. 28, 1978, abandoned, and Ser. No. 944,643, Sep. 21, 1978, abandoned.

[51] Int. Cl.$^3$ .............................................. D01D 5/04
[52] U.S. Cl. .................................. 264/167; 264/12; 264/147; 264/508; 425/7
[58] Field of Search ...................... 264/12–14, 264/140, 147, 508, 541; 425/7

[56] References Cited

U.S. PATENT DOCUMENTS

| | | | |
|---|---|---|---|
| 2,297,726 | 10/1942 | Sterhanoff | 264/12 |
| 2,508,462 | 5/1950 | Marshall | 264/12 |
| 2,982,991 | 5/1961 | Karlovity | 65/16 |
| 3,224,852 | 12/1965 | Stalego | 264/12 |
| 3,357,808 | 12/1967 | Eberle | 65/7 |
| 3,400,189 | 9/1968 | Nacke | 264/8 |
| 3,421,873 | 1/1969 | Bnugman et al. | 264/167 |
| 3,424,832 | 1/1969 | Chisholm | 264/8 |
| 3,607,596 | 9/1971 | Fairbanks | 264/167 |
| 3,719,733 | 3/1973 | Rakestraw et al. | 264/9 |
| 3,856,513 | 12/1974 | Chen et al. | 75/122 |
| 3,881,540 | 5/1975 | Kavesh | 264/237 |
| 3,881,541 | 5/1975 | Bedell | 264/175 |
| 3,885,940 | 5/1975 | Levecque et al. | 65/5 |
| 3,953,185 | 4/1976 | Aoki et al. | 264/167 |
| 4,025,593 | 5/1977 | Raganato et al. | 264/12 |
| 4,047,861 | 9/1977 | Balaz | 425/7 |
| 4,081,226 | 3/1978 | Pleska et al. | 425/6 |
| 4,116,656 | 9/1978 | Mukai et al. | 65/5 |
| 4,135,903 | 1/1979 | Ohsato et al. | 65/5 |
| 4,189,455 | 2/1980 | Raganato et al. | 264/140 |
| 4,303,431 | 12/1981 | Torobin | 264/12 |
| 4,303,432 | 12/1981 | Torobin | 264/12 |
| 4,303,433 | 12/1981 | Torobin | 65/21.4 |
| 4,303,603 | 12/1981 | Torobin | 264/69 |
| 4,303,729 | 12/1981 | Torobin | 428/327 |
| 4,303,736 | 12/1981 | Torobin | 428/403 |
| 4,326,841 | 4/1982 | Kay | 425/6 |
| 4,363,646 | 12/1982 | Torobin | 264/12 |
| 4,415,512 | 11/1983 | Torobin | 264/9 |

OTHER PUBLICATIONS

Kendal et al., J. Vac. Sci. Technol., 20, (4), pp. 1091–1093, Apr. 1982.

Primary Examiner—Jay H. Woo
Assistant Examiner—J. Fortenberry
Attorney, Agent, or Firm—Perry Carvellas

[57] ABSTRACT

Relatively long plastic microfilaments are used to make reinforcing, filler materials and fabrics. A blowing gas is applied at a positive pressure to the inert surface of a liquid plastic film formed across a coaxial blowing nozzle to blow the film and form an elongated hollow tube having a thinned wall or weakened portion. An entraining fluid is directed at an angle over and around the blowing nozzle and as it passes over and around the blowing nozzle, it dynamically induces a pulsating or fluctuating pressure field at the opposite side of the blowing nozzle in the wake thereof and produces a laminar flow of entraining fluid in the vicinity of the forming elongated tube. The continued movement of the entraining fluid over the elongated tube produces asymmetric fluid drag forces on the tube, and at the thinned wall or weakened wall portion longitudinally breaks the tube to form a multiplicity of plastic microfilaments, and detaches the plastic microfilaments from the elongated tube and from the coaxial blowing nozzle and the detached microfilaments are carried away from the blowing nozzle. Quench nozzles or heating nozzles may be disposed below and on either side of the blowing nozzle to direct cooling or heating fluid at and into contact with the plastic microfilaments to cool or heat and cure, solidify and harden the plastic to form hard, smooth plastic microfilaments.

18 Claims, 6 Drawing Figures

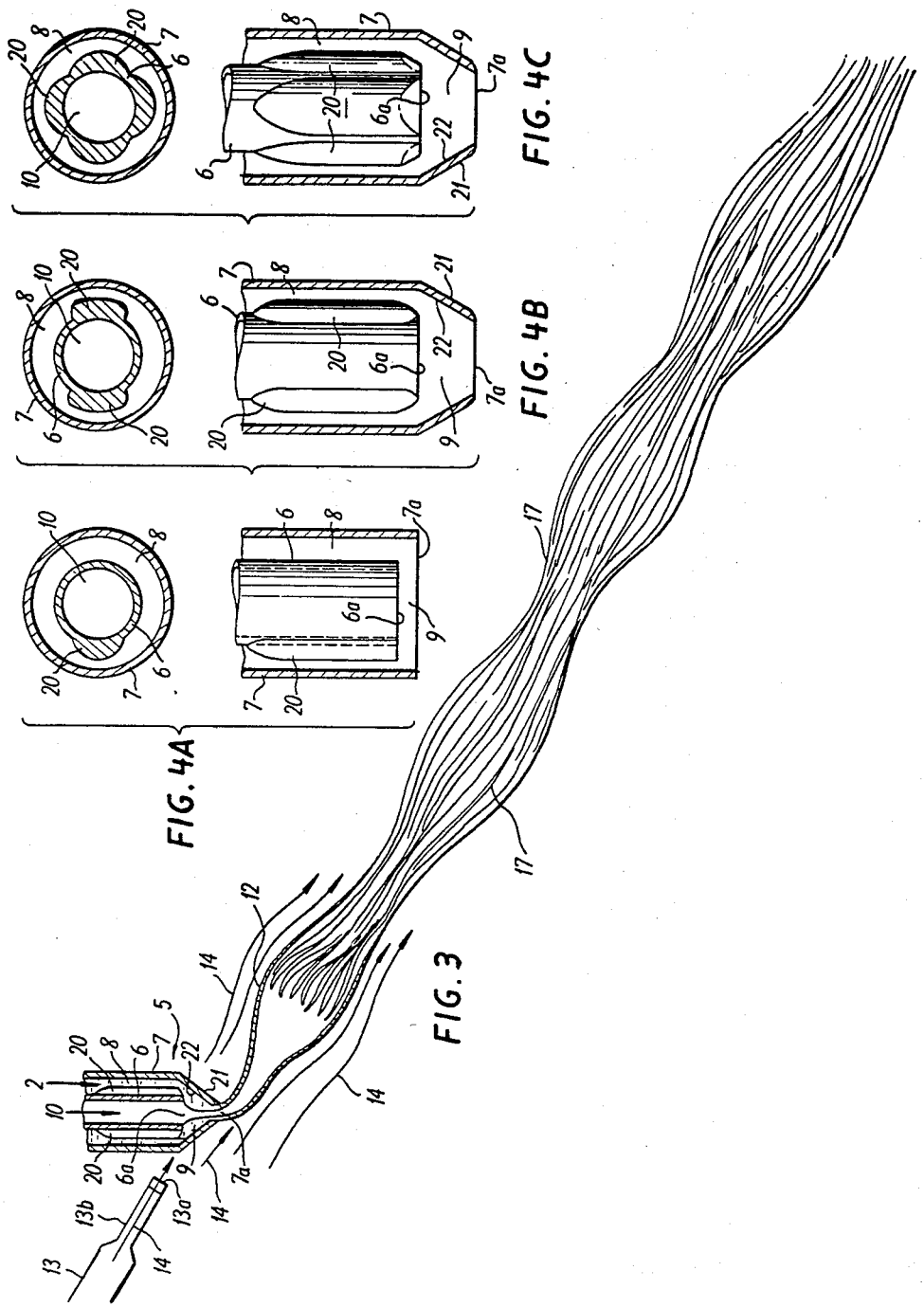

METHOD FOR PRODUCING PLASTIC MICROFILAMENTS

SUMMARY OF THE INVENTION

The present application is a continuation-in-part of applicant's copending application Ser. No. 325,594, filed Nov. 27, 1981 and copending application Ser. No. 428,923, filed Sept. 30, 1982. Application Ser. No. 325,594 is a continuation-in-part of applicant's application Ser. No. 152,693, filed May 23, 1980, which is a continuation of Ser. No. 059,297, filed July 20, 1979. Application Ser. No. 428,923 is a continuation of application Ser. No. 103,113, filed Dec. 13, 1979, which is a divisional of application Ser. No. 059,296 filed July 20, 1979. The application Ser. No. 059,297 and the application Ser. No. 059,296 are each continuation-in-part applications of Ser. Nos. 937,123 and 944,643 filed Aug. 28, 1978 and Sept. 21, 1978, respectively. The application Ser. No. 152,693 is now U.S. Pat. No. 4,303,431. Application Ser. No. 325,594 is now U.S. Pat. No. 4,363,646. The applications Ser. Nos. 059,297, 059,296, 103,113, 937,123 and 944,643 are now abandoned.

The present invention relates to a method and apparatus for making microfilaments from organic film forming materials or compositions and particularly for making plastic microfilaments.

The present invention also relates to plastic microfilaments spun into fibers for the manufacture of woven plastic fabrics or rope and for the manufacture of matted fabrics.

The present invention also relates to plastic microfilaments used to make an improved reinforcing and filler material.

The present invention also relates to plastic microfilaments suitable for use as filler material and reinforcing material in rubber, plastics, concrete and asphalt compositions.

The present invention particularly relates to a method and apparatus for using a coaxial blowing nozzle to blow plastic microfilaments from liquid plastic compositions comprising forming an elongated hollow tube or cylinder of said plastic composition and subjecting the tube or cylinder during its formation to an external pulsating or fluctuating pressure field having periodic oscillations. The pulsating or fluctuating pressure field produces a laminar flow of entraining fluid in the vicinity of the forming elongated tube or cylinder which laminar flow assists in the formation of the tube or cylinder and in detaching the microfilaments from the blowing nozzle.

The invention more particularly relates to a method and apparatus for blowing microfilaments from plastic film forming compositions.

Means are provided for forming a thinned wall or weakened portion of the forming elongated hollow plastic tube or cylinder. The thinned wall or weakened portion of the elongated plastic tube or cylinder causes a longitudinal break along the length of the elongated plastic tube or cylinder. The pulsating or fluctuating pressure field causes the broken elongated tube or cylinder to flap and to form a multiplicity of small diameter plastic microfilaments. The continued feeding of liquid plastic to the coaxial nozzle stabilizes the longitudinal break in the elongated tube or cylinder a short distance below the coaxial nozzle. The plastic microfilaments are entrained in the entraining fluid, increase in length, are stretched and pulled and break away from the portion of the elongated cylinder attached to the coaxial nozzle.

A transverse jet is used to induce the external pulsating or fluctuating pressure field by directing the entraining fluid over and around the blowing nozzle at an angle to the axis of the blowing nozzle. The entraining fluid as it passes over and around the blowing nozzle envelops and acts on the liquid plastic as it is being blown to form the elongated plastic tube or cylinder and the plastic microfilaments and to detach the plastic microfilaments from the coaxial blowing nozzle.

Quench or heating means may be disposed close to and below the blowing nozzles to direct a quench or heating fluid onto the microfilaments to rapidly cool or heat and cure, solidify and harden the microfilaments.

BACKGROUND OF THE INVENTION

In recent years, the substantial increases in costs of basic materials such as metals, metal alloys, plastics, cement, asphalt, rubbers and the like has encouraged development and use of light weight structural materials, reinforcing materials and of filler materials to reduce the amount and cost of the basic materials used and the weight of the finished materials. One of the suggested filler materials utilizes plastic fibers. The present invention which produces relatively long plastic microfilaments at an economical low price provides an improved plastic microfilament material for use as a filler and reinforcing material.

The known methods of making plastic filaments and fibers suffer from the disadvantages of requiring the use of relatively large amounts of energy to manufacture a given amount of filaments or fibers and/or requiring large capital investments in filament or fiber drawing apparatus.

The known methods of producing plastic filaments and fibers also suffer the disadvantage of relatively low production rates.

The known methods of producing plastic filaments and fibers are also believed to suffer the disadvantage of not being able to produce filaments and fibers of relatively small uniform diameters and uniform lengths at economical costs.

The process and apparatus of the present invention are believed to overcome the disadvantages of the prior art processes and are capable of producing microfilaments of uniform diameter and relatively uniform length of controlled and predictable physical and chemical characteristics, quality and strength at economical low costs.

OBJECTS OF THE INVENTION

It is an object of the present invention to provide a process and an apparatus for making relatively long plastic microfilaments of uniform small diameters.

It is another object of the present invention to provide plastic microfilaments that are useful in the manufacture of improved structural materials.

It is another object of the present invention to produce plastic microfilaments having relatively long lengths and relatively uniform diameter size distribution.

It is another object of the present invention to provide plastic microfilaments for use in producing fibers, ropes and woven and matted fabrics.

It is another object of the present invention to produce in an economical simple manner plastic microfilaments which are substantially uniform in diameter, length and strength characteristics.

BRIEF DESCRIPTION OF THE INVENTION

The present invention relates to plastic microfilaments and to a process and apparatus for making the microfilaments.

The microfilaments are preferably made from thermosetting or thermoplastic compositions.

The plastic microfilaments of the present invention are made by forming a liquid film of thermoplastic or thermosetting plastic composition across a coaxial blowing nozzle, applying a blowing gas or an inert blowing gas at a positive pressure on the inner surface of the plastic film to blow the film and form an elongated hollow tube or cylinder shaped liquid film of liquid plastic. The elongated tube or cylinder is initially closed at its outer end and is attached at its inner end to the coaxial blowing nozzle. Means are provided in the coaxial blowing nozzle for forming a thinned wall or weakened portion of the forming elongated tube or cylinder. A transverse jet is used to direct an entraining fluid over and around the blowing nozzle. The entraining fluid as it passes over and around the blowing nozzle fluid dynamically induces a pulsating or fluctuating pressure field at the opposite or lee side of the blowing nozzle in the wake or shadow of the coaxial blowing nozzle and produces a laminar flow of entraining fluid in the area of the forming elongated tube or cylinder. The fluctuating pressure field has regular periodic lateral oscillations similar to those of a flag flapping in a breeze. The continued movement of the entraining fluid over the elongated cylinder produces asymmetric fluid drag forces on the cylinder, and at the thinned walled or weakened portion longitudinally breaks the cylinder to form a multiplicity of plastic microfilaments, and detaches the microfilaments from the elongated cylinder and from the coaxial blowing nozzle and the detached filaments are carried away from the blowing nozzle. The surface tension forces of the liquid plastic composition act on the microfilament and causes the diameter of the microfilament to seek a minimum surface area and to form a circular cross-section.

The thin walled or weakened section of the elongated cylinder causes the cylinder to break along its longitudinal length. The induced fluctuating pressure field causes the elongated cylinder to flap and to quickly enlarge the break and to form a multiplicity of small diameter microfilaments. The break proceeds up the length of the elongated cylinder towards the coaxial nozzle. The continued feeding of liquid plastic to the coaxial nozzle stabilizes the break a short distance below the coaxial nozzle. The microfilaments are entrained in the transverse jet entraining fluid, are stretched, increase in length and pulled and break away from the portion of the elongated cylinder attached to the coaxial blowing nozzle.

The means for providing the thinned wall or weakened portion of the forming elongated hollow tube or cylinder may be contained within the coaxial blowing nozzle in the annular space between the outer coaxial nozzle and the inner coaxial nozzle. The means provided may take the form of one or more thickened or enlarged portions of the inner nozzle disposed lengthwise on the outer surface of the inner nozzle. The length, diameter and height of the thickened or enlarged portions are such that they cause the flow of liquid plastic as it passes over and around the thickened or enlarged portions to become thinned and weakened. The thinned and weakened portion of the liquid plastic is carried downwardly and outwardly into the forming elongated hollow cylinder or tube. It is this thinned or weakened portion of the forming elongated hollow cylinder or tube that causes the cylinder or tube to break along its length and form the microfilaments. The thickened portion of the inner nozzle is disposed at or near the outer edge of the inner nozzle.

The liquid plastic temperature and feed rate, the transverse jet entraining fluid linear velocity, the blowing gas pressure and the quench rate at a given coaxial nozzle gap will to some extent determine the microfilament length and diameter and size distribution.

A balancing but slightly lower gas pressure than the blowing gas pressure is provided in the area in which the elongated cylinder is formed.

Quench nozzles where the plastic is thermoplastic and heating nozzles where the plastic is thermosetting may be disposed below and on either side of the blowing nozzle to direct cooling or heating fluid at and into contact with the liquid plastic microfilaments to rapidly cool or heat and solidify the liquid plastic and form hardened, smooth microfilaments of relatively long length. Where a thermosetting plastic is used, the microfilaments may be heated and cured and the cured plastic microfilaments can be subsequently cooled.

THE ADVANTAGES

The present invention overcomes many of the problems associated with prior attempts to produce plastic microfilaments and fibers. The process and apparatus of the present invention allows the production of plastic microfilaments of relatively long length and relatively uniform diameter such that superior structural materials and improved filler and reinforcing materials can be designed, manufactured and tailor made to suit a particular desired use.

The relatively long plastic microfilaments produced in accordance with the present invention have the distinct advantage that due to the method of manufacture microfilaments of small uniform diameter and relatively uniform length can be obtained.

The process and apparatus of the present invention provide a practical means by which relatively long plastic microfilaments can be made at economic prices and in large quantities for use as filler and reinforcing materials and in the manufacture of fibers and fabrics.

The microfilaments of the present invention because of their relatively long length can be spun into fibers and ropes, and can be woven into fabrics, and can be used to make matted fabrics.

BRIEF DESCRIPTION OF THE DRAWINGS

The attached drawings illustrate exemplary forms of the method and apparatus of the present invention for making plastic microfilaments.

FIG. 3 of the drawings is an enlarged detailed cross-section of a modified form of a blowing nozzle in which the lower end of the nozzle is tapered inwardly.

FIG. 4A of the drawings is a detailed cross-section and a top plane view of a coaxial blowing nozzle tip of the type shown in FIG. 2.

FIG. 4B of the drawings is a detailed cross-section and top plane view of a coaxial blowing nozzle tip of the type illustrated in FIG. 3 of the drawings.

FIG. 4C of the drawings is a detailed cross-section and top plane view of a modified form of a coaxial blowing nozzle.

DETAILED DISCUSSION OF THE DRAWINGS

The invention will be described with reference to the accompanying Figures of the drawings wherein like numbers designate like parts throughout the several views.

Figure 1:
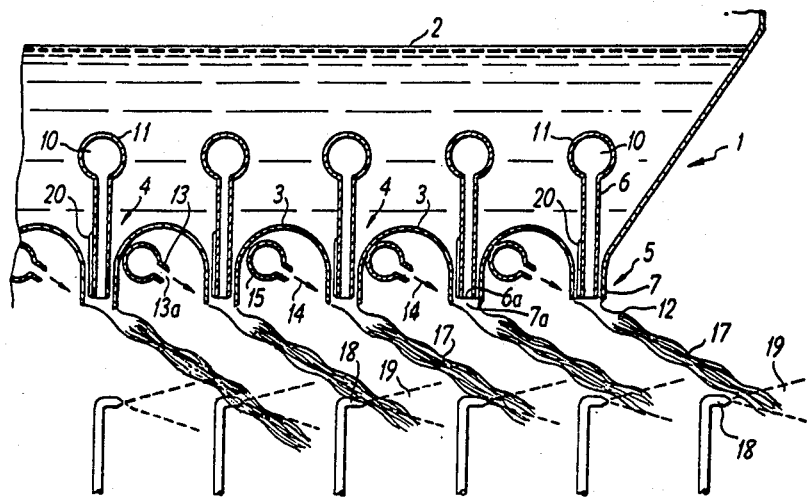
FIG. 1 of the drawings shows in cross-section an apparatus having multiple coaxial blowing nozzle means for supplying the gaseous material for blowing plastic microfilaments, a transverse jet for providing an entraining fluid to assist in the formation and detachment of the microfilaments from the blowing nozzles, and means for supplying a quench or heating fluid to cool or heat the microfilaments.
Figure 2:
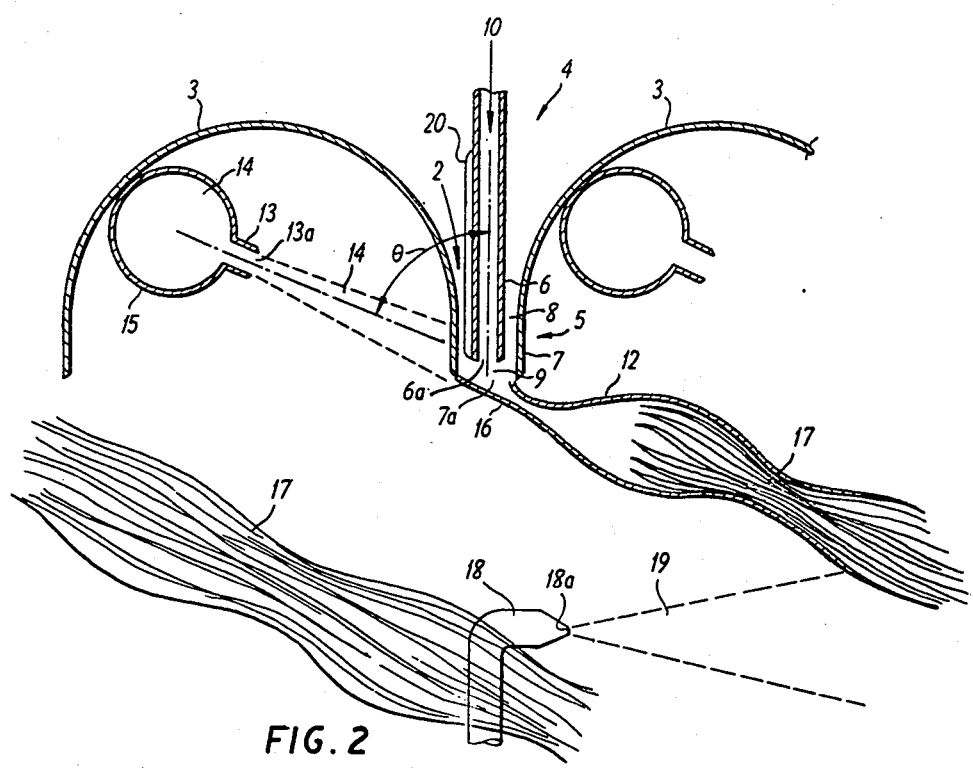
FIG. 2 of the drawings is an enlarged detailed cross-section of the nozzle means of apparatus shown in FIG. 1.

Referring to FIGS. 1 and 2 of the drawings, there is illustrated a vessel 1, made of suitable container material and heated, as necessary, by means not shown for holding liquid plastic 2. The bottom floor 3 of vessel 1 contains a plurality of openings 4 through which liquid plastic 2 is fed to coaxial blowing nozzles 5. The coaxial blowing nozzle 5 can be made separately or can be formed by a downward extension of the bottom 3 of vessel 1. The coaxial blowing nozzle 5 consists of an inner nozzle 6 having an orifice 6a for a blowing gas or an inert blowing gas and an outer nozzle 7 having an orifice 7a for liquid plastic. The inner nozzle 6 is disposed within and coaxial to outer nozzle 7 to form annular space 8 between nozzles 6 and 7, which annular space provides a flow path for liquid plastic 2. The orifice 6a of inner nozzle 6 terminates at or a short distance above the plane of orifice 7a of outer nozzle 7.

There is disposed in annular space 8 on the outer surface of inner nozzle 6 a thickened or enlarged portion 20 as the means for providing the thinned wall or weakened portion of the elongated hollow plastic tube or cylinder. The length, diameter and height of the thickened or enlarged portion 20 are such that they cause the flow of liquid plastic as it passes over and around the thickened or enlarged portion 20 to become thinned and weakened.

The liquid plastic 2 at about atmospheric pressure or at elevated pressure flows downwardly through annular space 8 and fills the area 9 between orifice 6a and 7a. The surface tension forces in liquid plastic 2 form a thin liquid plastic film 9 across orifice 6a and 7a.

A blowing gas 10 which is at or below ambient temperature or which is heated by means not shown to about the temperature of the liquid plastic and which is at a pressure above the liquid plastic pressure at the blowing nozzle, is fed through distribution conduit 11 and inner coaxial nozzle 6 and brought into contact with the inner surface of liquid plastic film 9. The blowing gas exerts a positive pressure on the liquid plastic film to blow and distend the film outwardly to form the elongated cylinder shaped liquid film 12 of liquid plastic filled with the blowing gas 10. The elongated cylinder 12 is initially closed at its outer end and is connected at its inner end to outer nozzle 7 at the peripheral edge of orifice 7a. The thinned and weakened portion of the liquid plastic is carried downwardly and outwardly to form the elongated hollow plastic tube or cylinder 12.

The elongated hollow plastic tube or cylinder is subjected during its formation to an external pulsating or fluctuating pressure field having periodic oscillations. The pulsating or fluctuating pressure field produces a laminar flow of entraining fluid in the vicinity of the forming elongated hollow plastic tube or cylinder 12.

The thinned wall or weakened portion of the elongated cylinder or tube 12 causes a longitudinal break along the length of the elongated cylinder 12. The pulsating or fluctuating pressure field causes the broken elongated cylinder 12 to flap and to form a multiplicity of small diameter microfilaments 17. The continued feeding of liquid plastic 2 to the coaxial nozzle 5 stablizes the longitudinal break in the elongated cylinder a short distance below the coaxial nozzle 5. The plastic microfilaments, however, remain connected to each other at the end of the elongated cylinder connected to the coaxial blowing nozzle. The microfilaments 17 are entrained in the entraining fluid 14, increase in length, are stretched and pulled and break away from the portion of the elongated cylinder attached to the coaxial nozzle.

A balancing pressure of a gas or of an inert gas, i.e. a slightly lower pressure, is provided in the area of the blowing nozzle into which the elongated tube or cylinder shaped liquid film is blown. The illustrated coaxial nozzle can be used to produce plastic microfilaments having relatively long lengths and relatively thick uniform diameters and is useful in blowing plastic microfilaments from low viscosity plastic material.

A transverse jet 13 is used to induce the external pulsating or fluctuating pressure field by directing an entraining fluid 14 over and around the blowing nozzle 5 at an angle to the axis of the blowing nozzle. The entraining fluid 14 is heated to about, below or above the temperature of the liquid plastic 2, by means not shown. The entraining fluid 14 is fed through distribution conduit 15, nozzle 13 and transverse jet nozzle orifice 13a and directed at the coaxial blowing nozzle 5. The transverse jet 13 is aligned to direct the flow of entraining fluid 14 over and around blowing nozzle 7 in the microfilament forming region at and behind the orifice 7a. The entraining fluid as it passes over and around the blowing nozzle 5 envelops and acts on the liquid plastic as it is being blown to form the elongated hollow tube or cylinder 12 and the microfilaments 17 and to detach the microfilaments from the coaxial blowing nozzle. The surface tension forces of the liquid plastic act on the diameter of the entrained, falling microfilaments 17 and cause the diameter of the microfilaments to seek a minimum surface area and to form a circular shaped cross-section area.

Quench or heating nozzles 18 having orifices 18a are disposed below and on both sides of coaxial blowing nozzle 5 and direct cooling or heating fluid 19 at and into contact with the liquid plastic microfilaments 17 to rapidly cool or heat and cure and solidify the liquid plastic and form smooth, hardened plastic microfilaments. The quench or heating fluid 19 also serves to carry the plastic microfilaments away from the coaxial blowing nozzle 5. Sufficient heating and curing time can be provided by using a heated fluidized bed, heated liquid carrier or belt carrier system for the thermosetting plastic microfilaments to cure and harden the microfilaments with substantially little or no distortion or effect on the size or shape of the microfilaments. The solidified and hardened plastic microfilaments are collected by suitable means not shown.

The FIG. 3 of the drawings illustrates a preferred embodiment of the invention in which the lower portion of the outer coaxial nozzle 7 is tapered downwardly and inwardly at 21. This embodiment as in the previous embodiment comprises coaxial blowing nozzle 5 which consists of inner nozzle 6 with orifice 6a and outer nozzle 7 with orifice 7a. The figure of the drawings also shows elongated hollow plastic tube or cylinder shaped liquid film 12 with a pinched portion 16 and a multiplicity of plastic microfilaments 17. There is shown disposed in annular space 8 on two opposite sides of the lower outer surface of inner nozzle 6 two thickened or enlarged portions 20 as the means for providing the thinned wall or weakened portion of the elongated plastic tube or cylinder 12. The length, diameter and height of the thickened or enlarged portions 20 are such that they cause the flow of liquid plastic as it passes over and around the enlarged or thickened portions 20 to become thinned and weakened.

The use of the tapered nozzle 21 construction is found to substantially assist in the formation of a thin liquid plastic film 9 in the area between orifice 6a of inner nozzle 6 and orifice 7a of outer nozzle 7. The inner wall surface 22 of the tapered portion 21 of the outer nozzle 7 when pressure is applied to liquid plastic 2 forces the liquid plastic 2 to squeeze through a fine gap formed between the outer edge of orifice 6a and the inner surface 22 to form the thin liquid plastic film 9 across orifice 6a and 7a. Thus, the formation of the liquid plastic film 9 does not in this embodiment rely solely on the surface tension properties of the liquid plastic. The illustrated coaxial nozzle can be used to produce plastic microfilaments having relatively long lengths and allows making microfilaments of smaller diameter than those made using the FIG. 2 apparatus and is particularly useful in blowing high viscosity plastic materials and compositions.

The diameter of the microfilaments is determined in part by the thickness of the wall of the elongated hollow plastic tube or cylinder which is determined by the gap formed by the tapered nozzle 21 and the outer edge of the inner nozzle 6a. This apparatus allows the use of larger inner diameters of outer nozzle 7 and larger inner diameters of inner nozzle 6, both of which reduce the possiblity of plugging of the coaxial nozzles when in use.

The FIG. 3 of the drawings also shows an embodiment of the invention in which the outer portion of the transverse jet 13 is flattened to form a generally rectangular or oval shaped orifice opening 13a. The orifice opening 13a can be disposed at an angle relative to a line drawn through the central axis of coaxial nozzle 5. The preferred angle, however, is that illustrated in the drawing. That is, at an angle of about 45° to the central axis of the coaxial nozzle 5.

The use of the flattened transverse jet entraining fluid was found, at a given velocity, to concentrate the effect of the fluctuating pressure field and to increase the amplitude of the pressure fluctuations induced in the region of the formation of the elongated hollow plastic tube or cylinder at the opposite or lee side of the blowing nozzle 5.

The FIGS. 4A, 4B and 4C of the drawings show detailed cross-sections and top plane views of three embodiments of the coaxial blowing nozzle tips of the present invention.

In the FIG. 4A there is shown disposed in annular space 8 on the lower outer surface of inner nozzle 6 a single thickened or enlarged portion 20 for providing the thinned wall or weakened portion of the elongated hollow tube or cylinder 12.

In the FIG. 4B there is shown disposed in annular space 8 on opposite sides of the lower outer surface of inner nozzle 6 two thickened or enlarged portions 20 for providing the thinned wall or weakened portions of the elongated hollow tube or cylinder 12.

In the FIG. 4C there is shown disposed in annular space 8 equally spaced on the outer surface of inner nozzle 6 four thickened or enlarged portions 20 for providing the thinned wall or weakened portions of the elongated hollow tube or cylinder 12.

ORGANIC FILM FORMING MATERIAL AND PLASTIC COMPOSITIONS

The organic film forming material and compositions and particularly the plastic materials and compositions from which the plastic microfilaments of the present invention are made can be varied to obtain the desired physical characteristics for blowing and forming, cooling or heating and curing the microfilaments and the desired strength characteristics of the plastic microfilaments produced. The constituents of the plastic compositions can vary depending on their intended use.

The process and apparatus of the present invention can be used to blow microfilaments from suitable film forming plastic materials or compositions having sufficient viscosity at the temperature at which the microfilaments are blown to form a stable elongated cylinder shape of the plastic material being blown and the microfilaments.

The plastic materials to be used to form the microfilaments are selected and can be treated and/or mixed with other materials to adjust their viscosity and surface tension characteristics such that at the desired blowing temperatures they form stable films and are capable of forming the elongated hollow plastic tubes or cylinders and microfilaments of the desired length and diameters.

The plastic compositions that can be used to form microfilaments include thermosetting and thermoplastic materials such as polyethylene, polypropylene, polystyrene, polyesters, polyurethanes, polychloro-trifluoro ethylene, polyvinyl fluoride, polyvinylidene, polymethyl methacrylate, polyacetyl, phenol-formaldehyde resins and silicone and polycarbonate resins. The plastic compositions that can be used also include cellulose acetate, cellulose acetate-butyrate, and cellulose acetate-propionate.

Thermoplastic resins that can be used are polyvinyl resins such as polyvinyl alcohol, polyvinyl chloride, copolymers of vinyl chloride and vinyl acetate, polyvinyl butyral, polystyrene, polyvinylidene chloride, and acrylic resins such as polymethyl methacrylate, polyallyl, polyethylene, and polyamide (nylon) resins.

Thermosetting resins that can be used include alkyd, polysiloxane, phenol-formaldehyde, urea-formaldehyde and melamine-formaldehyde resins.

The plastic compositions disclosed in applicant's U.S. Pat. No. 4,303,603, Veatch et al U.S. Pat. No. 2,797,201 and the Morehouse, Jr. U.S. Pat. No. 3,615,972 can be used in carrying out the present invention and the disclosures of said patents are accordingly incorporated herein in their entirety by reference.

There may be added to the plastic compositions chemical agents or additives which effect the viscosity of the compositions or of the surface film of the microfilaments in order to obtain the desired viscosities needed to obtain a stable film for blowing the hollow elongated tube or cylinder. Suitable chemical agents are materials that act as solvents for the plastic compositions. The solvents that are used will, of course, depend on the solubility in the solvent of the plastic composition used. Water, alcohols, ethers, esters, organic acids, hydrocarbons and chlorinated hydrocarbons can be used as solvents. To assist in the blowing and formation of the plastic microfilaments and to control the surface tension and viscosity of the elongated cylinder being formed suitable surface active agents, such as colloidal particles of insoluble substances and viscosity stabilizers can be added to the plastic composition as additives. These additives can affect the viscosity of the surface film of the hollow elongated tube or cylinder to stabilize the film during cylinder formation.

For a more specific description of the plastic and resin compositions see Zimmerman and Lavine, "Handbook of Material Trade Names", Vols. I-IV, 1953-1965.

The plastic compositions of the present invention are formulated to have a relatively narrow temperature difference between the liquid temperature and the plastic hardening temperature (thermoplastic) or a relatively narrow temperature difference between the liquid temperature and the thermosetting and curing temperature. The plastic compositions are formulated such that they have a high rate of viscosity increase with the hardening temperature or the thermosetting temperature such that the microfilaments will rapidly solidify, harden and strengthen. That is, they change from liquid to solid within a relatively narrowly defined temperature range and/or cure in a relatively short time.

BLOWING GAS

The plastic microfilaments can be blown with a gas, e.g. an inert gas. Suitable blowing gases can be argon, nitrogen and air. The blowing gases can be selected to react with the plastic film forming material or composition, e.g. to assist in the hardening and/or curing of the microfilaments. The blowing gas in reacting with the film forming material as the elongated cylinder is being blown and formed, can to some extent help to stabilize (against break-up) the film forming plastic material used to form the elongated cylinder and microfilaments and allow sufficient time for the microfilaments to form and harden. For certain uses, oxygen or air can be used as or added to the blowing gas. The blowing gas can include a catalyst or hardening agent for the plastic compositions. The addition of a catalyst or hardening agent to the blowing gas prevents contact of the catalyst or hardening agent with the plastic composition until a time just before the hollow elongated tube or cylinder is formed.

The entraining fluid can be a gas at a high or low temperature and can be selected to react with or be inert to the plastic composition. Suitable entraining fluids are nitrogen, air, steam and argon. A gaseous catalyst for the plastic can also be included in the entraining fluid.

The quench or heating fluid can be a liquid, a liquid dispersion or a gas. Suitable quench or heating fluids are steam, a fine water spray, air, nitrogen or mixtures thereof. The selection of a specific quench or heating fluid and quench or heating temperature depends to some extent on the plastic composition from which the hollow elongated tube or cylinder is blown.

PROCESS CONDITIONS

The organic film forming materials and/or plastic materials and compositions of the present invention are in a liquid-fluid form at the desired blowing temperature and during the blowing operation. The liquid plastic composition can be at a temperature of about 0° C. to about 400° C., preferably 10° C. to 300° C. and more preferably 20° C. to 200° C., depending on the constituents and state of polymerization of, for example, the plastic composition. The plastic composition at the blowing temperature is liquid, fluid and flows easily. The liquid plastic just prior to the blowing operation can have a viscosity of 0.10 to 600 poises, usually 10 to 350 poises and more usually 30 to 200 poises.

The liquid plastic is continuously fed to the coaxial blowing nozzle during the blowing operation to prevent premature breaking and detaching of the elongated tube or cylinder shaped liquid plastic film as it is being formed by the blowing gas.

The blowing gas or, inert blowing gas will be at about the same temperature as the liquid plastic being blown. The blowing gas temperature can, however, be at a higher temperature than the liquid plastic to assist in maintaining the fluidity of the hollow liquid plastic tube or cylinder during the blowing operation or can be at a lower temperature than the liquid plastic to assist in the solidification and hardening of the plastic microfilaments as they are formed. The pressure of the blowing gas is sufficient to blow the microfilaments and will be slightly above the pressure of liquid plastic film at the orifice 7a of the outer nozzle 7. The blowing gas pressure will also depend on and be slightly above the ambient pressure external to the blowing nozzle.

The temperatures of the blowing gases will depend on the blowing gas used and the viscosity-temperature-shear relationship for the film forming plastic materials used to make the microfilaments. The ambient pressure external to the blowing nozzle will be such that it substantially balances, but is slightly less than the blowing gas pressure.

The transverse jet inert entraining fluid which is directed over and around the coaxial blowing nozzle to assist in the formation of the hollow elongated tube or cylinder and detaching of the plastic microfilaments from the coaxial blowing nozzle can be at about the same temperature as the liquid plastic being blown. The entraining fluid can, however, be at a higher temperature than the liquid plastic to assist in maintaining the fluidity of the hollow elongated tube or cylinder and the microfilaments during the blowing operation or can be at a lower temperature than the liquid plastic to assist in the stabilization of the forming elongated hollow tube or cylinder film and in the solidification and hardening of the microfilaments.

The transverse jet entraining fluid which assists in detaching of the plastic microfilaments from the coaxial blowing nozzle can have a linear velocity in the region of microfilament formation of 1 to 120 ft/sec, usually 5 to 80 ft/sec and more usually 10 to 60 ft/sec.

The length of the plastic microfilaments and the diameter of the plastic microfilaments depends to some extent on the viscosity of the plastic material and the linear velocity of the transverse jet entraining fluid.

The quench or heating fluid is at a temperature such that it rapidly cools or heats the microfilaments to solidify, harden and strengthen the liquid plastic microfilaments. The quench cooling fluid can be at a temperature of 0° to 200° F., usually 40° to 200° F. and more usually 50° to 100° F. The heating fluid can be at a temperature of 100° to 800° F., usually 200° to 600° F. and more usually 300° to 500° F., depending on the plastic composition.

The time elapsed from commencement of the blowing of the thermoplastic composition to the cooling and initial hardening of the microfilaments can be 0.0001 to 60.0 seconds, preferably 0.0010 to 30.0 seconds and more preferably 0.10 to 10.0 seconds.

Where a thermosetting plastic composition is used to form the microfilaments, the time elapsed from commencement of the blowing of the plastic elongated hollow tube or cylinder to the heating and curing of the microfilaments can be 0.10 second to 30 minutes, preferably 1 second to 20 minutes and more preferably 10 seconds to 10 minutes.

APPARATUS

Referring to FIGS. 1 and 2 of the drawings, the container vessel is constructed to maintain the liquid plastic at the desired operating temperatures. The liquid plastic 2 is fed to coaxial blowing nozzle 5. The coaxial blowing nozzle 5 consists of an inner nozzle 6 having an outside diameter of 0.32 to 0.010 inch, preferably 0.20 to 0.015 inch and more preferably 0.10 to 0.20 inch and an outer nozzle 7 having an inside diameter of 0.420 to 0.020 inch, preferably 0.260 to 0.025 inch and more preferably 0.130 to 0.030 inch. The inner nozzle 6 and outer nozzle 7 form annular space 8 which provides a flow path through which the liquid plastic 2 is extruded. The distance between the inner nozzle 6 and outer nozzle 7 can be 0.050 to 0.004, preferably 0.030 to 0.005 and more preferably 0.015 to 0.008 inch.

The orifice 6a of inner nozzle 6 terminates a short distance above the plane of orifice 7a of outer nozzle 7. The orifice 6a can be spaced above orifice 7a at a distance of 0.001 to 0.125 inch, preferably 0.002 to 0.050 inch and more preferably 0.003 to 0.025 inch. The liquid plastic 2 flows downwardly and is extruded through annular space 8 and fills the area between orifice 6a and 7a The orifices 6a and 7a can be made from stainless steel, platinum alloys, glass of fused alumina. Stainless steel, however, is preferred. The surface tension forces in the liquid plastic 2 form a thin liquid plastic film 9 across orifices 6a and 7a which has about the same or a smaller thickness as the distance of orifice 6a is spaced above orifice 7a. The liquid plastic film 9 can be 25 to 3175 microns, preferably 50 to 1270 microns and more preferably 76 to 635 microns thick.

The FIG. 2 blowing nozzle can be used to blow liquid plastic at relatively low viscosities, for example, of 10 to 60 posies, and to blow plastic microfilaments of relatively thick diameter, for example, of 20 to 100 microns or more.

The transverse jet 13 is used to direct an entraining fluid 14 through nozzle 13 and transverse jet nozzle orifice 13a at the coaxial blowing nozzle 5. The coaxial blowing nozzle 5 has an outer diameter of 0.52 to 0.30 inch, preferably 0.36 to 0.035 inch and more preferably 0.140 to 0.040 inch.

The transverse jet 13 is aligned to direct the flow of entraining fluid 14 over and around outer nozzle 7 in the hollow elongated tube or cylinder and microfilament forming region of the orifice 7a. The orifice 13a of transverse jet 13 is located a distance of 0.5 to 14 times, preferably 1 to 10 times and more preferably 1.5 to 8 times and still more preferably 1.5 to 4 times the outside diameter of coaxial blowing nozzle 5 away from the point of intersection of a line drawn along the center axis of transverse jet 13 and a line drawn along the center axis of coaxial blowing nozzle 5. The center axis of transverse jet 13 is aligned at an angle of 15° to 85°, preferably 25° to 75° and more preferably 35° to 55° relative to the center axis of the coaxial blowing nozzle 5. The orifice 13a can be circular in shape and have an inside diameter of 0.32 to 0.010 inch, preferably 0.20 to 0.015 inch and more preferably 0.10 to 0.020 inch.

The line drawn through the center axis of transverse jet 13 intersects the line drawn through the center axis of coaxial blowing nozzle 5 at a point above the orifice 7a of outer nozzle 7 which is 0.5 times to 4 times, preferably 1.0 to 3.5 times and more preferably 2 to 3 times the outside diameter of the coaxial blowing nozzle 5.

The entraining fluid assists in the formation and detaching of the plastic microfilaments from the coaxial blowing nozzle. The use of the transverse jet and entraining fluid in the manner described also discourages wetting of the outer wall surface of the coaxial blowing nozzle 5 by the liquid plastic being blown.

The quench or heating nozzles 18 are disposed below and on both sides of coaxial blowing nozzle 5 a sufficient distance apart to allow the microfilaments 17 to fall between the quench nozzles 18. The quench nozzles 18 direct cooling or heating fluid 19 at and into contact with the liquid plastic microfilaments 17 to cool or heat and solidify the liquid plastic and form hard, smooth, plastic microfilaments.

The FIG. 3 of the drawings illustrates a preferred embodiment of the invention. It is found that in blowing liquid plastic compositions at high viscosities it is advantageous to immediately prior to blowing the liquid plastic to provide by extrusion a very thin liquid plastic film for blowing into the elongated cylinder shape liquid film 12. The thin liquid plastic film 9 is provided by having the lower portion of the outer coaxial nozzle 7 tapered downwardly and inwardly at 21. The tapered portion 21 and inner wall surface 22 thereof can be at an angle of 15° to 75°, preferably 30° to 60° and more preferably about 45° relative to the center axis of coaxial blowing nozzle 5. The orifice 7a can be 0.10 to 1.5 times, preferably 0.20 to 1.1 times and more preferably 0.25 to 0.8 times the inner diameter of orifice 6a of inner nozzle 6.

The thickness of the liquid plastic film 9 can be varied by adjusting the distance of orifice 6a of inner nozzle 6 above orifice 7a of outer nozzle 7 such that the distance between the peripheral edge of orifice 6a and the inner wall surface 22 of tapered nozzle 21 can be varied. By controlling the distance between the peripheral edge of orifice 6a and the inner wall surface 22 of the tapered nozzle to form a very fine gap and by controlling the pressure applied to feed the liquid plastic 2 through annular space 8 the liquid plastic 2 can be squeezed or extruded through the very fine gap to form a relatively thin liquid plastic film 9.

The proper gap can best be determined by pressing the inner coaxial nozzle 6 downward with sufficient pressure to completely block-off the flow of plastic, and to then very slowly raise the inner coaxial nozzle 6 until a stable system is obtained, i.e. until the hollow elongated plastic cylinder and the plastic microfilaments are being formed.

The tapered nozzle construction illustrated in FIG. 3 can be used to blow plastic compositions at relatively high viscosities as well as to blow plastic compositions at the relatively low viscosities referred to with regard to FIG. 2 of the drawings. The FIG. 3 embodiment of the invention is of particular advantage in blowing relatively long small diameter microfilaments.

Referring to FIGS. 4A, 4B and 4C of the drawings there is shown disposed in annular space 8 on the outer surface of inner nozzle 6 means for providing the thinned wall or weakened portion of the elongated hollow tube or cylinder in the form of thickened or enlarged portion 20. The length, diameter and height of the thickened or enlarged portion 20 are such that they cause the flow of liquid plastic as it passes over and around the thickened or enlarged portion 20 to become thinned and weakened. The thinned and weakened portion of the liquid plastic is carried downwardly and outwardly to form the elongated hollow plastic tube of cylinder 12, which as a result of the thinned and weakened portion breaks up into a multiplicy of relatively long microfilaments 17.

DESCRIPTION OF THE MICROFILAMENTS

The microfilaments made in accordance with the present invention can be made from a variety of organic film forming materials and compositions, particularly plastic compositions.

The plastic microfilaments made in accordance with the present invention can be made from suitable compositions selected to have relatively high temperature resistance, be resistant to chemical attack and be resistant to weathering.

The plastic microfilaments can be made in various lengths and diameters, depending upon the desired end use of the microfilaments. The microfilaments can have a length one half to twelve inches, preferably one to eight inches and more preferably two to six inches. The microfilaments can have a diameter of 0.5 to 40 microns, preferably 1.0 to 30 microns and more preferably 2 to 10 microns.

It is found that for a given set of operating conditions that the plastic microfilaments that are obtained have a relatively uniform, narrow diameter size and length size distribution.

EXAMPLES

EXAMPLE 1

A thermoplastic composition comprising polyethylene polymer is used to make plastic microfilaments.

A plastic composition is heated to form a fluid plastic having a viscosity of about 10 to 20 poises at the blowing nozzle.

The liquid plastic is fed to the apparatus of FIGS. 1 and 2 of the drawings. The liquid plastic passes through annular space 8 of about 0.005 inch, of blowing nozzle 5 and forms a thin liquid plastic film across the orifices 6a and 7a. A heated blowing gas consisting of nitrogen at a positive pressure is applied to the inner surface of the liquid plastic film causing the film to distend downwardly into an elongated cylinder shape with its inner end attached to the outer edge or orifice 7a.

The transverse jet is used to direct an entraining fluid which consists of nitrogen heated to about the temperature of the liquid plastic, at a linear velocity of 20 to 80 feet per second over and around the blowing nozzle 5 which entraining fluid assists in the formation of the elongated cylinder and of a multiplicity of plastic microfilaments and detaching of the plastic microfilaments from the elongated cylinder and causing the plastic microfilaments to be entrained in the entraining fluid and carried away from the blowing nozzle 5. The transverse jet is aligned at an angle of 35° to 50° relative to the blowing nozzle.

The entrained plastic microfilaments are cooled to about ambient temperature by a cool quench fluid consisting of a fine water spray which quickly cools, solidifies and hardens the plastic microfilaments.

Plastic microfilaments having a diameter of 2 to 6 microns diameter and a one to five inch length are obtained.

EXAMPLE 2

A thermosetting plastic composition comprising a mixture of 50% by weight acrylonitrile and 50% by weight vinylidene chloride and a suitable catalyst is used to make plastic microfilaments.

The plastic composition mixture at the blowing nozzle has a viscosity of about ten poises.

The liquid plastic mixture is heated and is fed to the apparatus of FIGS. 1 and 3 of the drawings. The liquid plastic is passed through annular space 8 of blowing nozzle 5 and into tapered portion 21 of outer nozzle 7. The liquid plastic under pressure is squeezed and extruded through a fine gap formed between the outer edge of orifice 6a and the inner surface 22 of the tapered portion 21 of outer nozzle 7 and forms a thin liquid plastic film across the orifices 6a and 7a. A heated blowing gas consisting of nitrogen at a positive pressure is applied to the inner surface of the liquid plastic film causing the film to distend outwardly into an elongated cylinder shape with its inner end attached to the outer edge of orifice 7a.

The transverse jet is used to direct an entraining fluid which consists of heated nitrogen at about the temperature of the liquid plastic at a linear velocity of 20 to 80 feet per second over and around the blowing nozzle 5. The entraining fluid assists in the formation of the elongated cylinder and of a multiplicity of plastic microfilaments and detaching of the plastic microfilaments from the elongated cylinder and causes plastic microfilaments to be entrained in the fluid and carried away from the blowing nozzle.

The entrained microfilaments are contacted with a heating fluid consisting of heated nitrogen which solidifies, hardens and begins to cure the liquid plastic microfilaments.

Plastic microfilaments having a 1 to 5 micron diameter and having a length of 2 to 10 inches are obtained.

UTILITY

The plastic microfilaments of the present invention have many uses including the use of the microfilaments as a filler or reinforcing material in rubber, cement, plaster and asphalt compositions. The plastic microfilaments and fibers can be used to make tire cords and filter media.

The microfilaments can be spun into fibers and woven into fabrics or can be used to make matted fabrics.

The plastic microfilaments can advantageously be used in plastic or resin boat construction to produce high strength hulls.

These and other uses of the present invention will become apparent to those skilled in the art from the foregoing description and the following appended claims.

It will be understood that various changes and modifications may be made in the invention, and that the scope thereof is not to be limited except as set forth in the claims.

What is claimed:

1. A method for making microfilaments from an organic film forming material which comprises forming a liquid film of said organic material across an orifice, applying a blowing gas at a positive pressure on the inner surface of the liquid organic film to blow the film and form an elongated hollow organic material tube or cylinder, forming a thinned wall or weakened portion of the elongated hollow tube or cylinder, subjecting the elongated hollow tube or cylinder during its formation to an external pulsating or fluctuating pressure field having periodic oscillations, said pulsating or fluctuating pressure field acting on said elongated hollow tube or cylinder to assist in its formation and to assist in the formation of a multiplicity of organic material microfilaments and in detaching the organic material microfilaments from said orifice.

2. The method of claim 1 wherein the liquid film of organic film forming material is formed across the orifice of a coaxial blowing nozzle, said blowing nozzle having an inner nozzle to convey said blowing gas to the inner surface of the liquid organic material film, and an outer nozzle to convey said organic material to said orifice and means disposed near said orifice forming the thinned wall or weakened portion of said elongated hollow organic material tube or cylinder, and pulsating or fluctuating pressure inducing means is directed at an angle to said coaxial blowing nozzle to induce said pulsating or fluctuating pressure field at the opposite or lee side of said coaxial blowing nozzle in the wake or shadow of said coaxial blowing nozzle.

3. The method of claim 1 wherein an entraining fluid is directed at an angle to a coaxial blowing nozzle having an orifice, an inner nozzle and an outer nozzle, the liquid film of organic film forming material is formed across the orifice, the blowing gas is conveyed to the inner surface of the liquid organic film through said inner nozzle, the film forming organic material is conveyed through said outer nozzle to said orifice, and means disposed near said orifice between the inner and outer nozzle form a thinned wall or weakened portion of said elongated hollow organic material tube or cylinder and the entraining fluid passes over and around said coaxial nozzle to fluid dynamically induce the pulsating or fluctuating pressure field at the opposite or lee side of the blowing nozzle in the wake or shadow of the coaxial blowing nozzle.

4. The method of claim 3 wherein the lower portion of the outer nozzle is tapered inwardly to form with the outer edge of the inner nozzle a fine gap and the film forming organic material is fed under pressure and extruded through said gap to form a thin film of film forming organic material across the orifice of the blowing nozzle.

5. A method for making plastic microfilaments from a plastic film forming material, which comprises forming a liquid plastic film across an orifice, applying a blowing gas at a positive pressure on the inner surface of the liquid plastic film to blow the film and form an elongated hollow plastic tube or cylinder, forming a thinned wall or weakened portion of the elongated hollow tube or cylinder, subjecting the elongated hollow tube or cylinder during its formation to a pulsating or fluctuating pressure field having periodic oscillations, said pulsating or fluctuating pressure field acting on said elongated hollow tube or cylinder to assist in its formation and to assist in the formation of a multiplicity of plastic microfilaments and in detaching the plastic microfilaments from said orifice.

6. The method of claim 5 wherein the liquid plastic film is formed across the orifice of a coaxial blowing nozzle, said blowing nozzle having an inner nozzle to convey said blowing gas to the inner surface of the liquid plastic film, and an outer nozzle to convey said liquid plastic to said orifice and means disposed near said orifice between the inner and outer nozzle form a thinned wall or weakened portion of said elongated hollow tube or cylinder, and pulsating or fluctuating pressure inducing means is directed at an angle to said coaxial blowing nozzle to induce said pulsating or fluctuating pressure field at the opposite or lee side of said coaxial blowing nozzle in the wake or shadow of said coaxial blowing nozzle.

7. The method of claim 6 wherein the liquid plastic has a viscosity of 0.10 to 600 poises.

8. The method of claim 6 wherein the liquid plastic has a viscosity of 10 to 350 poises.

9. The method of claim 6 wherein the liquid plastic has a viscosity of 30 to 200 poises.

10. The method of claim 3 wherein said entraining fluid has a linear velocity in the region of the elongated hollow tube or cylinder formation of 1 to 120 ft/sec and entrains and transports the microfilaments away from the blowing nozzle.

11. The method of claim 10 wherein said entraining fluid has a linear velocity in the region of elongated hollow tube or cylinder formation of 5 to 80 ft/sec.

12. The method of claim 10 wherein said entraining fluid has a linear velocity in the region of elongated hollow tube or cylinder formation of 10 to 60 ft/sec.

13. The method of claim 6 wherein the plastic microfilaments are one to 8 inches in length and have a diameter of 1.0 to 30 microns.

14. The method of claim 6 wherein the plastic microfilaments are 2 to 6 inches in length and 2.0 to 10 microns in diameter.

15. A method for making plastic microfilaments which comprises forming liquid plastic, forming a liquid plastic film across an orifice of a coaxial blowing nozzle, said blowing nozzle having an inner nozzle to convey a blowing gas to the inner surface of the liquid film and an outer nozzle to convey said liquid plastic to said orifice, applying said blowing gas through said inner nozzle at positive pressure on the inner surface of the liquid plastic film to blow the film downwardly and outwardly to form an elongated hollow plastic tube or cylinder, means disposed near said orifice between the inner and outer nozzle form a thinned wall or weakened portion of said elongated hollow tube or cylinder, continuously feeding said liquid plastic to said outer nozzle while said elongated hollow tube or cylinder is being formed, directing an entraining fluid at said coaxial blowing nozzle at an angle relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, said entraining fluid acting on the elongated hollow plastic tube or cylinder to break up said tube or cylinder into a multiplicity of plastic microfilaments which are connected to said tube or cylinder at a point proximate to the coaxial blowing nozzle and said entraining fluid acting to detach the plastic microfilaments from the coaxial blowing nozzle and solidifying said plastic microfilaments.

16. The method of claim 15 wherein the lower portion of the outer nozzle is tapered inwardly to form with the outer edge of the orifice of the inner nozzle a fine gap and feeding the liquid plastic under pressure through said gap to form a thin film of liquid plastic across the orifice of the blowing nozzle.

17. The method of claim 16 wherein the plastic microfilaments are one to 8 inches in length and have a diameter of 1.0 to 30 microns.

18. The method of claim 16 wherein the plastic microfilaments are 2 to 6 inches in length and 2.0 to 10 microns in diameter.

* * * * *